March 11, 1941.  R. G. WILLIAMS  2,234,907
SCREW ANCHOR
Filed Oct. 6, 1939
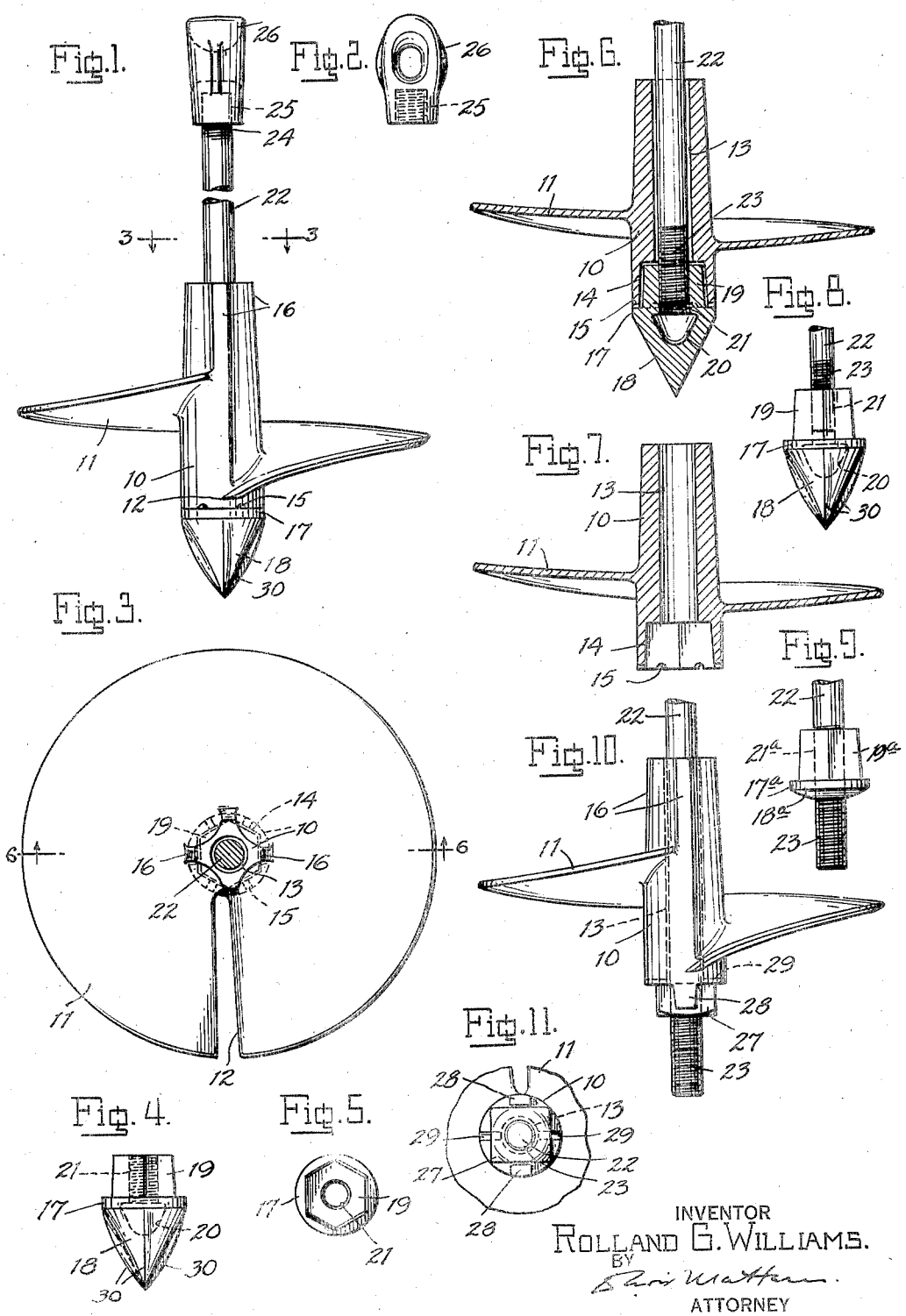
INVENTOR
ROLLAND G. WILLIAMS.
BY
ATTORNEY Patented Mar. 11, 1941

2,234,907

UNITED STATES PATENT OFFICE 2,234,907

SCREW ANCHOR

Rolland G. Williams, Fort Myers, Fla., assignor to Malleable Iron Fittings Company, Branford, Conn., a corporation of Connecticut Application October 6, 1939, Serial No. 298,209

3 Claims. (Cl. 189—91)

The present invention relates to an improvement in screw anchor, particularly of the type adapted to be screwed into the ground to anchor the guy wires of pole installations.

The known type of screw anchor for this purpose consists of a helix element in which a rod is directly and fixedly screwed, the helix element having a threaded socket corresponding in diameter to the diameter of the rod, the threaded end of the rod being screwed into the socket. It is desirable in certain installations to employ relatively small diameter rods, particularly where there is not a heavy pull on the anchor, while in other installations a large diameter rod is found necessary, so that with these previously known types of screw anchors it has been necessary to supply a variety of helix elements designed to receive different diameter rods. Interchangeability of small and large diameter rods with a single type of helix element is not possible with these known screw anchors, and pole installation crews have had to carry a variety of sizes of complete anchor assemblies in order to meet different ground conditions, which has been both expensive and inconvenient. A further disadvantage of these known screw anchors is the fact that the direct screwing of the rod into threads formed directly in the helix element imposed the strain between the rod and helix element directly upon the threads of the helix element, resulting in a structure which was apt to break under heavy strain.

It is an object of the present invention to provide a screw anchor in which a standardized helix element is employed, and which may have rods of different diameters interchangeably connected thereto. A further object is to provide a screw anchor in which the helix element is entirely free of screw threads and in which the strain of the rod is imposed against the lower end of the hub of the helix element, so that there will be no danger of breakage due to strain. To this end it is proposed to provide a nut member engaging the lower end of the hub and into which the rod is screwed, the rod extending through a central passage in the helix element. It is proposed to provide nut members with different diameters of internal threads to receive the different diameter rods, the nuts being otherwise standardized to fit the standardized helix element. Inasmuch as no machining operations are necessary upon the helix element, these operations being confined to the nut element, there is a considerable saving in time and economy of manufacture.

It is further proposed to provide a screw anchor in which there is a relatively loose relation between the rod and the helix element, so that there will be a compensating movement between them in the event that obstructions are encountered or there is uneven strain upon the rod.

Another object is to provide a screw anchor structure in which the nut member constitutes a pilot or gimlet point. It is proposed in one embodiment of the invention to provide a nut through which the threaded end of the rod projects so that such threaded rod end constitutes an effective pilot or gimlet point. Another object is to provide a screw anchor which will be self-draining, so that any water collected in it will drain out. A further object is to provide wrench engaging means upon the hub of the helix element by means of which the wrench for screwing in the anchor may be more readily engaged therewith, and will have a wedging self-tightening connection with the wrench, so that during the screwing in operation there will be no lost motion between the anchor and the wrench, and at the same time the wrench may be easily removed after the screwing in operation.

With the above and other objects in view, embodiments of the invention are shown in the accompanying drawing, and these embodiments will be hereinafter more fully described with reference thereto, and the invention will be finally pointed out in the claims.

In the drawing:

Fig. 1 is a side elevation of a screw anchor, according to an exemplary illustrated embodiment of the invention, the rod being broken away at its intermediate portion.

Fig. 2 is a front elevation of the eye-nut for the upper end of the rod.

Fig. 3 is a horizontal sectional plan view of the screw anchor taken along the line 3—3 of Fig. 1.

Fig. 4 is a side elevation of the nut member for securing the rod to the helix element.

Fig. 5 is a top view thereof.

Fig. 6 is a vertical sectional view taken along the line 6—6 of Fig. 3.

Fig. 7 is a vertical sectional view of the helix element.

Fig. 8 is a side elevation of a nut member having a smaller diameter threaded base for receiving a smaller diameter rod than the rod illustrated in Figs. 1 to 6.

Fig. 9 is a side elevation of a modified form of nut member having the rod extended therethrough to form a pilot or gimlet extension, this nut member and rod adapted to fit the helix element as shown in Figs. 1 to 7.

Fig. 10 is a side elevation of a modified form of screw anchor in which a nut member has the threaded end of the rod extended therethrough to provide a pilot or gimlet extension.

Fig. 11 is a bottom plan view thereof, the helix being partially broken away.

Similar reference characters indicate corresponding parts throughout the several figures of the drawing.

Referring to the drawing, and particularly to Figs. 1 to 8 thereof, the screw anchor, according to the exemplary embodiment of the invention illustrated therein, comprises a helix element consisting of a hub 10 having a helical blade 11 integrally formed thereon, this blade having a wide circular outline and being so generated that its lead edge 12 will screw into the ground as the hub is turned, so that the blade will constitute a wide laterally extending anchor against axial pull on the hub, the blade forming a base for the cone of earth between it and the surface.

The hub is provided with a cylindrical axial rod receiving passage 13, extending from the upper end of the hub to a nut-receiving hexagonal pocket 14 in the lower end of the hub, the side walls of this pocket being slightly tapered inwardly. The lower end of the hub is provided with a series of radial grooves 15 adapted to form water drains, as will hereinafter more fully appear.

At its outer surface the hub is cylindrical at its lower portion below the helical blade, while at its upper portion above the blade it tapers toward the upper end and is provided with equally spaced longitudinally extending ribs 16, preferably four in number, the surfaces between the ribs being concave. This constitutes the wrench engaging portion of the hub, it being understood that the wrench, which has a tubular shaft, that fits over the anchor rod, is engaged with the hub, the tapered and ribbed structure permitting the wrench to be readily engaged with a wedge fit, so that during the screwing in operation there will be no lost motion. The taper also enables the wrench to be readily removed by upward pull thereon.

The rod securing nut member consists of an intermediate cylindrical shoulder portion 17 corresponding in diameter to the lower end of the hub 10 of the helix element, a cone point 18, tapered downwardly from the shoulder portion 17, and a hexagonal nut portion 19 extending upwardly from the shoulder portion, this nut portion being slightly tapered and adapted to fit into the hexagonal pocket 14 in loose interlocking relation, there being looseness both at the sides and the top so that the shoulder portion 17 will seat firmly upon the lower end of the hub 10. The nut member is cored out, as at 20, to facilitate casting and subsequent threading, and is provided with a threaded bore 21, the diameter and thread size depending upon the rod diameter and thread size, but in any case being smaller than the diameter of the passage 13. Upon the conical point 18 there are projected a series of ribs or flutings 30, their leading edges being sharp while their following surfaces blend into the conical surface. These ribs taper at their lower ends to the point of the nut, while their upper ends blend into the cylindrical portion 17, so that there is no obstruction to the turning of the cylindrical portion. The intermediate portions of the ribs bulge out, preferably in convex outline. These ribs function as a means to facilitate loosening of the soil preparatory to screwing in the anchor, and act as a gimlet during the screwing in operation, being especially useful in cutting into hard soil.

The rod 22 which may be of any desired diameter to engage loosely in the passage 13 is provided with screw threads 23 at its lower end which screw into the bore 21 of the nut. At its upper end the rod is provided with screw threads 24 which are engaged by the threaded socket 25 of the guy wire attaching eye nut 26. In Fig. 6 there is shown a realtively large diameter rod, while in Fig. 8 there is shown a smaller diameter rod, and these may be interchangeably assembled with the helix element.

In operation the selected size of rod with its securing nut is fitted into the helix element and the anchor is thereupon screwed into the ground by means of the tubular wrench engaged over the rod, the eye nut 26 being removed during this operation and screwed upon the rod after removal of the wrench.

As shown clearly in Fig. 6 there is a clearance space about the rod and the nut portion 19 communicating with the drain grooves 15, so that water collecting in the hub will not be trapped but will drain out through the grooves 15.

In Fig. 9 I have illustrated a modified form of retaining nut comprising a lower shoulder portion 17$^a$ having a convex under surface 18$^a$ and a hexagonal upper nut portion 19$^a$, and provided with a threaded bore 21$^a$ extending completely through it. This is screwed upon the rod 22 up to the end of the threads 23, so that the lower rod end projects and constitutes a threaded pilot or gimlet point. This nut and rod assembly fits the helix element shown in Figs. 1 to 7.

In Figs. 10 and 11 I have illustrated a further modification in which an ordinary square nut 27 is employed to retain the rod 22, being screwed upon the lower threaded end 23 up to the end of the threads, the lower end of the rod projecting to form a threaded pilot or gimlet point. The hub 10 of the helix element has the central passage 13 extending to its lower end, and formed upon this lower end are downwardly projecting lugs 28—28 to retain the nut against relative turning. Between the lugs there are provided radial drain grooves 29.

I have illustrated and described preferred and satisfactory embodiments of the invention, but it will be understood that changes may be made therein, within the spirit and scope thereof, as defined in the appended claims.

Having thus described my invention, what I claim and desire to secure by Letters Patent is:

1. A screw anchor comprising a helix element including a hub of the type to be non-rotatably and removably engaged by an anchor-sinking wrench and a helical blade surrounding said hub, said hub having an axial passage extending therethrough from end to end, an internally threaded nut member removably engaged with the lower end of said hub, non-circular cooperative interlockingly engageable means on said hub and nut member retaining said nut member against rotation relatively to said hub whereby said nut member is rotatable with said hub, and a rod loosely engaged through said hub passage having a threaded end removably screwed into said nut, said rod being rotatable in said hub passage through rotation relatively to said nut member.

2. A screw anchor comprising a helix element including a hub of the type to be non-rotatably and removably engaged by an anchor-sinking wrench and a helical blade surrounding said hub, said hub having an axial passage extending therethrough from end to end, an internally threaded nut member removably engaged with the lower end of said hub projecting downwardly therefrom to constitute a ground engaging member in advance of the body of the hub during downward screwing of the helix element in the ground, non-circular cooperative interlockingly engageable means on said hub and nut member retaining said nut member against rotation relative to said hub whereby said nut member is rotatable with said hub, and a rod loosely engaged through said hub passage having a threaded end removably screwed into said nut member, said rod being rotatable in said hub passage through rotation relatively to said nut member.

3. A screw anchor comprising a helix element including a hub of the type to be non-rotatably and removably engaged by an anchor-sinking wrench and a helical blade surrounding said hub, said hub having an axial passage extending therethrough from end to end and including a non-circular shouldered socket in its lower end, an internally threaded nut member removably engaged with the lower end of said hub including an upper non-circular portion interlockingly engageable with said pocket retaining said nut member against rotation relatively to said hub whereby said nut member is rotatable with said hub, an intermediate annular shoulder portion engaged with the lower end of said hub, and a lower conical point portion projecting downwardly from said shoulder portion, and a rod loosely engaged through said hub passage having a threaded end removably screwed into said nut member, said rod being rotatable in said hub passage through rotation relatively to said nut member.

ROLLAND G. WILLIAMS.